(12) United States Patent
Cherukuri

(10) Patent No.: US 11,009,698 B2
(45) Date of Patent: May 18, 2021

(54) GAZE-BASED USER INTERFACE FOR AUGMENTED AND MIXED REALITY DEVICE

(71) Applicant: Nick Cherukuri, Princeton, NJ (US)

(72) Inventor: Nick Cherukuri, Princeton, NJ (US)

( * ) Notice: Subject to any disclaimer, the term of this patent is extended or adjusted under 35 U.S.C. 154(b) by 0 days.

(21) Appl. No.: 16/352,559

(22) Filed: Mar. 13, 2019

(65) Prior Publication Data

US 2020/0292813 A1 Sep. 17, 2020

(51) Int. Cl.
| | | |
|---|---|---|
| *G06T 19/00* | (2011.01) | |
| *G02B 27/01* | (2006.01) | |
| *G06F 3/01* | (2006.01) | |
| *G06F 3/0481* | (2013.01) | |
| *G02B 27/00* | (2006.01) | |
| *G06F 1/16* | (2006.01) | |

(52) U.S. Cl.
CPC ....... *G02B 27/0093* (2013.01); *G02B 27/017* (2013.01); *G06F 1/163* (2013.01); *G06F 3/011* (2013.01); *G06F 3/012* (2013.01); *G06F 3/013* (2013.01); *G06F 3/04812* (2013.01); *G06F 3/04817* (2013.01); *G06T 19/006* (2013.01)

(58) Field of Classification Search
CPC ........... G06F 1/163; G06F 2203/04804; G06F 3/011; G06F 3/012; G06F 3/013; G06F 3/017; G06F 3/04841; G06F 3/04842; G06F 3/04812; G06F 3/04815; G06F 3/04817; G06F 3/04845; G06F 3/0485; G09G 2340/12; G09G 2354/00; G09G 5/08; G02B 2027/0187; G02B 27/0172; G02B 27/0179

See application file for complete search history.

(56) References Cited

U.S. PATENT DOCUMENTS

| | | | | |
|---|---|---|---|---|
| 9,395,826 | B1 * | 7/2016 | Cronin | G06F 3/03547 |
| 2014/0247210 | A1 * | 9/2014 | Henderek | G06F 3/041 |
| | | | | 345/156 |
| 2014/0320389 | A1 * | 10/2014 | Scavezze | G06T 19/006 |
| | | | | 345/156 |
| 2015/0091793 | A1 * | 4/2015 | Lee | G06K 9/00597 |
| | | | | 345/156 |
| 2015/0153571 | A1 * | 6/2015 | Ballard | H04W 76/10 |
| | | | | 345/8 |
| 2015/0153913 | A1 * | 6/2015 | Ballard | G06F 3/04812 |
| | | | | 715/727 |

(Continued)

*Primary Examiner* — Jin Cheng Wang

(57) ABSTRACT

A system and method for providing gaze-based user interface for an augmented and mixed reality device, is disclosed. The system comprises a plurality of sensors, modules stored in a memory and executable by processors. The sensors are configured to track gaze direction and head motion of a user. A display module is configured to display a virtual menu comprising interactive contents and a cursor for selecting interactive contents. A gaze and head motion detector module is configured to receive an input representing a gaze direction and head motion of the user from the sensors to determine a target point on the virtual display. A mapping module is configured to map the target point with the interactive content on the virtual display. An output module is configured to execute functions of the mapped interactive content. The present invention utilizes plurality of sensor data to manipulate an interactive content at high accuracy.

15 Claims, 7 Drawing Sheets

(56) References Cited

U.S. PATENT DOCUMENTS

| | | | |
|---|---|---|---|
| 2015/0199111 A1* | 7/2015 | Okada | G06F 3/04817 |
| | | | 715/835 |
| 2015/0338651 A1* | 11/2015 | Wang | G06F 1/163 |
| | | | 345/8 |
| 2016/0239081 A1* | 8/2016 | Imoto | G06F 3/0481 |
| 2017/0038837 A1* | 2/2017 | Faaborg | G06T 7/70 |
| 2017/0092002 A1* | 3/2017 | Mullins | G06F 3/013 |
| 2017/0277378 A1* | 9/2017 | Rajabi | G06F 3/0481 |
| 2018/0032132 A1* | 2/2018 | Sudou | G09G 5/14 |
| 2018/0053056 A1* | 2/2018 | Rabinovich | G06F 3/0338 |
| 2019/0101980 A1* | 4/2019 | Stafford | G02C 11/10 |
| 2019/0215503 A1* | 7/2019 | Monson | G06F 3/0487 |
| 2019/0235729 A1* | 8/2019 | Day | G06F 3/012 |
| 2019/0279424 A1* | 9/2019 | Clausen | G06T 19/006 |
| 2020/0019781 A1* | 1/2020 | Smith | G06T 7/70 |

* cited by examiner

GAZE-BASED USER INTERFACE FOR AUGMENTED AND MIXED REALITY DEVICE

BACKGROUND OF THE INVENTION

A. Technical Field

The present invention generally relates to user interface for augmented reality (AR) and mixed reality (MR) device, and more specifically relates to a gaze-based user interface for augmented and mixed reality device.

B. Description of Related Art

Augmented Reality (AR) and Mixed Reality (MR) is a combination of both virtual reality and physical reality, which creates a completely new environment where both physical and digital objects co-exist and interact in real time. At present, mixed reality systems are still being developed and aren't as widely available as AR or VR device. Although there are some real-world examples of mixed reality technologies in use today, that includes a training tool for soldiers, and a gamming device. The mixed reality device implemented as a training tool provides a mixed-reality environment that allow a soldier to interact with synthetic objects that represent enemy troops, wherein the synthetic troops will appear to exist in the real world. According to another example, in an implementation of a mixed-reality environment utilized for gaming (e.g., a soccer match), a user may interact with a synthetic object (e.g., an opponent) and one or more synthetic objects (e.g., a soccer balls).

As the uses and complexity of computing systems have evolved, user interface design also needs to change dramatically to accommodate a mixed reality internet that overlays our real world. The user interface also needs to be easy to operate and enjoyable for the user. Existing interaction models for mixed reality interfaces are discussed as follows.

One method is gaze-based user interface, which allow a user to execute commands using their eyes. Intelligent gaze-added interfaces utilize a probabilistic algorithm and user model to interpret gaze focus and alleviate typical problems with eye-tracking data. Eye movements and, more specifically, information about what a person is looking at, provide great opportunities for more engaging, seemingly magical user experiences. However, they also entail several design challenges, which is not considered carefully result in overwhelming, aggravating experiences.

Another method is gesture-based user interface. Gestures provide the user with a new form of interaction that mirrors their experience in the real world. They feel natural and require neither interruption nor an additional device. Furthermore, they do not limit the user to a single point of input, but instead offer various forms of interaction. However, gestures need to be learned and remembered, which requires the development of guides that promote the discoverability and memorability of these gestures and deal with input and recognition errors. Another issue is in the design of the gestures itself, which should make them memorable and easy and comfortable to execute.

Yet another method is voice controlled user interface that allow the user to interact with a system through voice or speech commands. Voice user interface uses voice recognition to understand spoken commands and questions. However, voice recognition programs cannot understand the context of language the way that humans can, and leads to errors that are often due to misinterpretation.

Yet another method involves uses of traditional input devices such as controllers, a keyboard, a mouse or a display. When an input is entered into the input device, a corresponding output can be presented on the display. Some of the input is entered as a command for a corresponding action to be output. However, the entering of commands has traditionally been through the controller and/or a mouse and can be cumbersome to implement. For example, to input some commands, multiple keys on the keyboard need to be depressed in a certain order, or else the desired input is not achieved.

Few existing patent applications attempted to address the aforesaid problem are discussed herein. US20150153913 discloses a system and method that allows a user to interact with an augmented reality device. The system comprises a wearable device for providing a virtual menu to a user. The wearable device includes a display, at least one sensor configured to provide an output indicative of a viewing direction, and at least one processing device. At least one processing device is configured to: cause a virtual menu to be shown on the display; monitor a viewing direction of the user based on the output of the at least one sensor; determine, based on the monitored viewing direction, whether the user is looking in a direction of a selectable element of the virtual menu; determine an amount of time that the user looks in the direction of the selectable element; and cause at least one action associated with the selectable element if the amount of time exceeds a predetermined dwell time threshold.

US9041741 discloses a user interface for a head mounted display. The user interface allows a user to access one or more persistent data elements that are otherwise outside the user's initial field of view by using a head movement, such as a head tilt (i.e., movement about a horizontal axis) and/or rotation (i.e., movement about a vertical axis). Embodiments also provide for further movement and/or other manipulation of data of persistent data elements with further detected movement of the user's head.

US20170109936 discloses a system and method for interacting with virtual objects in a three-dimensional space using a wearable system. The wearable system is programmed to allow the user to interact with virtual objects using a user input device and poses. The wearable system also automatically determines contextual information such as layout of the virtual objects in the user's environment and switch the user input mode based on the contextual information.

However, the above discussed approaches to user interface system of augmented and mixed reality devices are merely intended to provide an overview of some of the problems of conventional approaches and techniques, and are not intended to be exhaustive. Particularly, the above discussed approaches lack to ensure accuracy.

Henceforth, there is need for a gaze-based user interface for augmented and mixed reality device that utilizes plurality of sensor data to manipulate an interactive item or content in a virtual display at high accuracy.

SUMMARY OF THE INVENTION

The present invention provides a system and method for providing gaze-based user interface for an augmented and mixed reality device.

The system comprises an augmented and mixed reality device having a gaze-based user interface. The device comprises a plurality of sensors, one or more processors, a memory and one or more modules stored in the memory and executable by the one or more processors. The modules comprise a display module, a gaze and head motion detector module, a mapping module, an output module and a customization module.

The plurality of sensors is configured to track and collect data regarding the user gaze and head motion. The plurality of sensors includes a standard inertial measurement unit (IMU) and a raw IMU. The plurality of sensors further includes, but not limited to accelerometer and gyroscope. The combination of sensor data input allows for smoother head motion gaze controls as the drift accuracy variability is eliminated using both accelerometer/gyroscope data inputs.

The display module is configured to provide a virtual menu or display comprising one or more interactive contents and a cursor for selecting the one or more interactive contents. The gaze and head motion detector module is configured to receive an input representing a gaze direction and head motion to determine a target point on a virtual display from the user. The mapping module is configured to map the target point or cursor point with the interactive content on the virtual display. Then, the user utilizes head motion to select the interactive content. In one embodiment, the interactive content includes, but not limited to, a scroll up icon, a scroll down icon, zoom in icon, zoom out icon, exit all icon, home screen icon, back icon, minimization icon, volume adjusting icon.

The output module is configured to execute one or more functions of the mapped interactive content. For example, on selecting a zoom in/zoom out icon, the output module is configured to allow for zooming in/out in any camera-based applications. The customization module is configured to: enable the user to customize the location of one or more interactive contents; enable the user to activate or deactivate the gaze-based user interface; enable the user to activate or deactivate one or more interactive contents, and enable the user to adjust the speed of the cursor.

In an embodiment of the present invention, a method for providing gaze-based user interface for an augmented and mixed reality device is disclosed. The method comprises a step of: displaying at the processor, via a display module, a virtual menu or display comprising one or more interactive contents and a cursor for selecting the one or more interactive contents. The method further comprises a step of: receiving at the processor, via a gaze and head motion detector module, an input representing a gaze direction and head motion from a user to select the one or more interactive contents. The method further comprises a step of: tracking and determining at the processor, via a gaze and head motion detector module, a target point on the virtual display based on the received input. The method further comprises a step of: mapping at the processor, via a mapping module, the target point with the interactive contents on the virtual display. The method further comprises a step of: executing at the processor, via an output module, one or more functions of the mapped interactive contents.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The embodiments herein will be better understood from the following detailed description with reference to the drawings, in which.

DETAILED DESCRIPTION OF EMBODIMENTS

Figure 1:
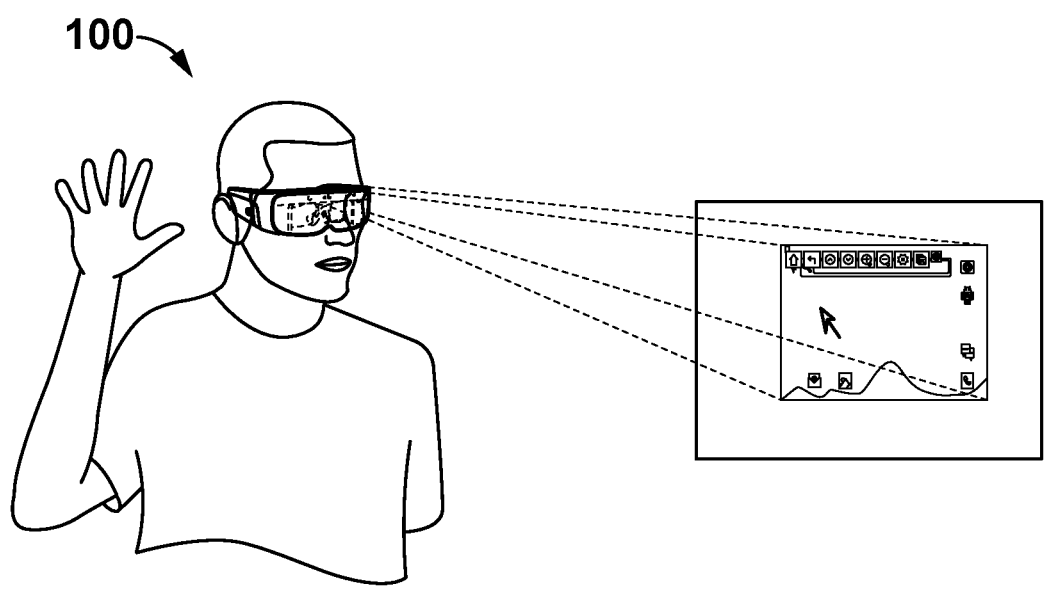
FIG. 1 exemplarily illustrates a user controlling an augmented and mixed reality device utilizing a gaze-based user interface in an embodiment of the present invention.

A description of embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These codes may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The present invention provides a system and method for providing gaze-based user interface for an augmented and mixed reality device. The present invention enables to manipulate an interactive item or content from a virtual display utilizing user's gaze at high accuracy. The present invention further provides a cursor controllable by user's gaze to manipulate the interactive item on the virtual display. Referring to FIG. 1, the system comprises an augmented and mixed reality device 100 having a gaze-based user interface. A user controlling device 100 utilizing a gaze-based user interface is illustrated in an embodiment of the present invention.

Figure 2:
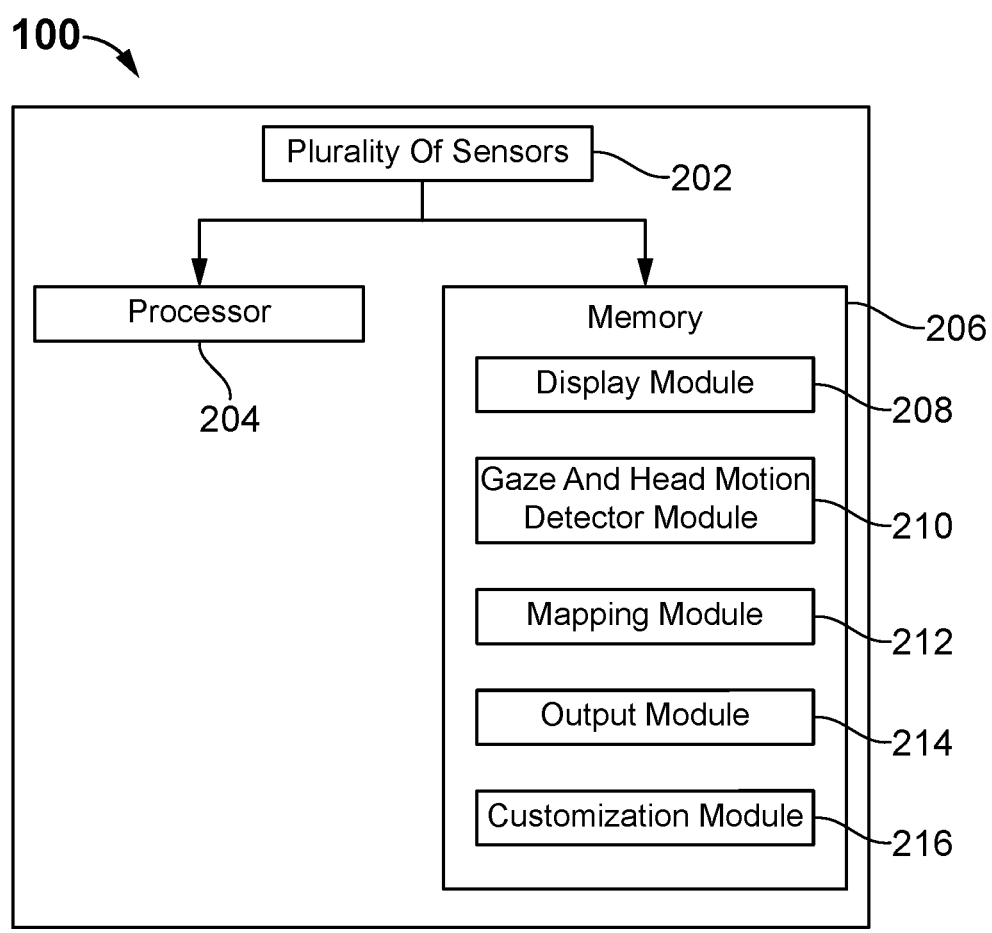
FIG. 2 exemplarily illustrates a block diagram comprising components of the device in an embodiment of the present invention.

Referring to FIG. 2, the augmented and mixed reality device 100 comprises a plurality of sensors 202, one or more processors 204, a memory 206 and one or more modules stored in the memory and executable by the one or more processors 204. The modules comprise a display module 208, a gaze and head motion detector module 210, a mapping module 212, an output module 214 and a customization module 216.

Figure 3:
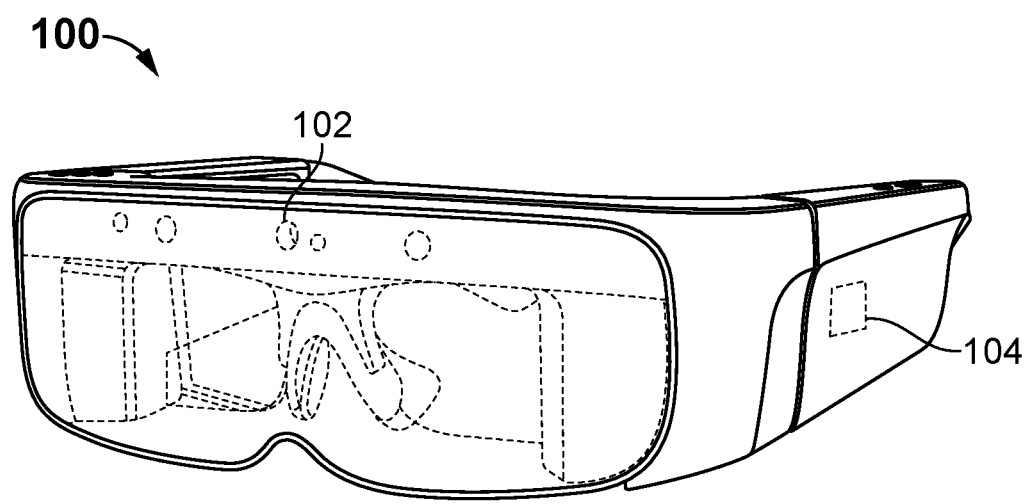
FIG. 3 exemplarily illustrates a front perspective view of the device in an embodiment of the present invention.
Figure 4:
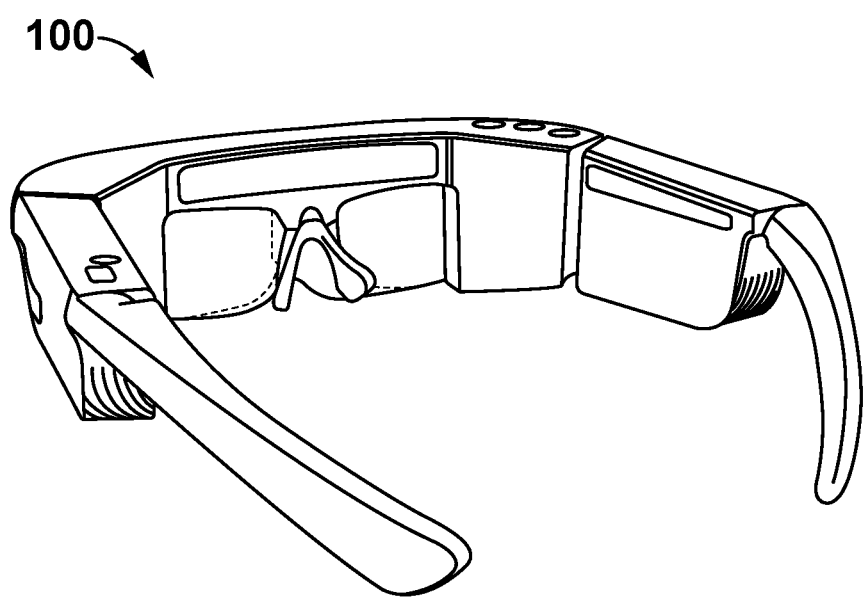
FIG. 4 exemplarily illustrates a rear perspective of the device in an embodiment of the present invention.

Referring to FIG. 3 and FIG. 4, in an embodiment, the device 100 is a wearable headset device. The plurality of sensors 202 are configured to track and collect data regarding the user gaze and head motion. The sensors 202 includes, but not limited to, a standard inertial measurement unit (IMU) and a raw IMU, accelerometer and gyroscope. The combination of sensor data input allows for smoother head motion gaze controls as the drift accuracy variability is eliminated using both accelerometer/gyroscope data inputs.

In one embodiment, the processors 204, the memory 206 and standard android IMU or standard IMU are enclosed at a side frame portion of the device 100, represented by numeral 104. In one embodiment, the raw IMU is disposed at a center region of an eyeglass frame of the headset device, represented by numeral 102. The raw IMU is coupled to a camera and the processor 204. In one embodiment, the raw IMU is coupled to the camera and the processor 204 via a dual cable. The dual cabling allows the data of the raw IMU to be sent more accurately. The design of the device 100 enables to send the raw IMU data to the developer, if the processor 204 heats up over 80 degrees Fahrenheit, to increase accuracy. If the processor 204 heats up, the data collected may be inaccurate. However, the design configuration of the device 100 transmits data via the dual cabling system that increases the accuracy of the device 100. The device 100 further comprises a power source. In one embodiment, the power source is a lithium-ion battery. The power source efficiency is optimized with the head motion gaze controls because in the device 100 the IMU is always running in the background so these UI controls does not result in additional battery usage. Also, this head motion controls is saved into the manifest .xml file of Android which allows the head motion gaze controls UI to start immediately upon device boot up with direct access to the IMU data. The device 100 could also be tuned for a transparent artificial reality (AR) background thus allowing the user to view the UI controls or interactive contents easily in various lighting situations.

The display module 208 is configured to provide a virtual menu or display comprising one or more interactive contents and a cursor for selecting one or more interactive contents. In one embodiment, the interactive contents or UI control are configured to spread across a wide field of view of both eyes. The gaze and head motion detector module 210 is configured to receive an input representing a gaze direction and head motion to determine a target point on the virtual display from the user.

The detailed working of the gaze and head motion control module 210 is disclosed herein. The gaze and head motion detector module 210 is configured to receive the input from the plurality of sensors 202 to accurately track the head motion in three degrees of freedom (3 DoF). The multiple sensor data is configured to block out any extraneous variability or odd input data and smoothen the user experience. As the raw IMU sensor is disposed at a dead center of the device 100 between both stereoscopic optical displays, the raw IMU sends data to both sides of the head without needing any modification. The raw IMU accelerometer data is not modified by Android (thus, the "raw" term) whereas the Android IMU sensor filters out very low/high values that are discrepancies. The combination of both of these modulates allows to track head motion accurately.

The IMU data is averaged with the android standard IMU and this android IMU values are inversed (because the android standard IMU is sideways in the Smart Glasses) and inputted into the head motion and gaze detector module 210 to determine the speed at which the head is moving. Also, magnets were not placed around either the raw or Android IMU which allows for greater accuracy of the IMU values.

The mapping module 212 is configured to map the target point or cursor point with the interactive content on the virtual display. Then, the user utilizes gaze and head motion to select the interactive content. In one embodiment, the interactive content includes, but not limited to, a scroll up icon, a scroll down icon, zoom in icon, zoom out icon, exit all icon, home screen icon, back icon, minimization icon, volume adjusting icon. Particularly, the user needs to stare at the interactive content for a predefined time, for example, 2-3 seconds, to execute an android click function.

The output module 214 is configured to execute a function of the mapped interactive content. In one embodiment, on selecting a zoom in/zoom out icon, the output module 214 is configured to allow for zooming in/out in any camera-based applications. In one embodiment, zoom in process is described as follows. At one step, the user uses gaze controls to select on "Zoom In" icon in UI display. At another step, the device 100 detects if current screen is camera sensor feed or not. At another step, if the input is from camera sensor feed, the device 100 performs zoom in function by digitally magnifying the camera view 2×. In one embodiment, the user could zoom in 2×, 4×, 8×. The zoom function stops at 8× as no more digital magnifying is available. At another step, if the input is not from camera sensor feed, the device 100 would alert the user using a pop up that current input cannot be zoomed in.

In one embodiment, zoom out process is described as follows. At one step, the user uses gaze controls to select on "Zoom Out" icon in UI display. At another step, the device 100 detects if current screen is camera sensor feed or not. At another step, if the input is from camera sensor feed, the device 100 performs zoom out function by digitally de-magnifying the camera view 2× each time. In one embodiment, the user is enabled to zoom out until camera sensor feed is back to standard android camera level at which point no more zoom out is possible. At another step, if the input is not from camera sensor feed, the device 100 would alert the user using a pop up that current input cannot be zoomed out.

In another embodiment, on selecting an "exit all" icon, the output module 214 is configured to simultaneously exit from all active applications running on the device 100. In yet another embodiment, on selecting the "home screen icon", the output module 214 is configured to enable display of home screen in the virtual display. In yet another embodiment, on selecting the "back button" icon, the output module 214 is configured to enable display of the previous screen. In yet another embodiment, on selection of "minimization/maximization icon", the output module 214 is configured to enable minimization/maximization based on the user preference. In yet another embodiment, on selection of at least one of a Volume+, Volume− and Mute buttons, the output module 214 is configured to enable control of volume according to the user preference.

The customization module 216 is configured to: enable the user to customize the location of one or more interactive contents; enable the user to activate or deactivate the gaze-based user interface; enable the user to activate or deactivate one or more interactive contents, and enable the user to adjust the speed of the cursor.

Figure 5:
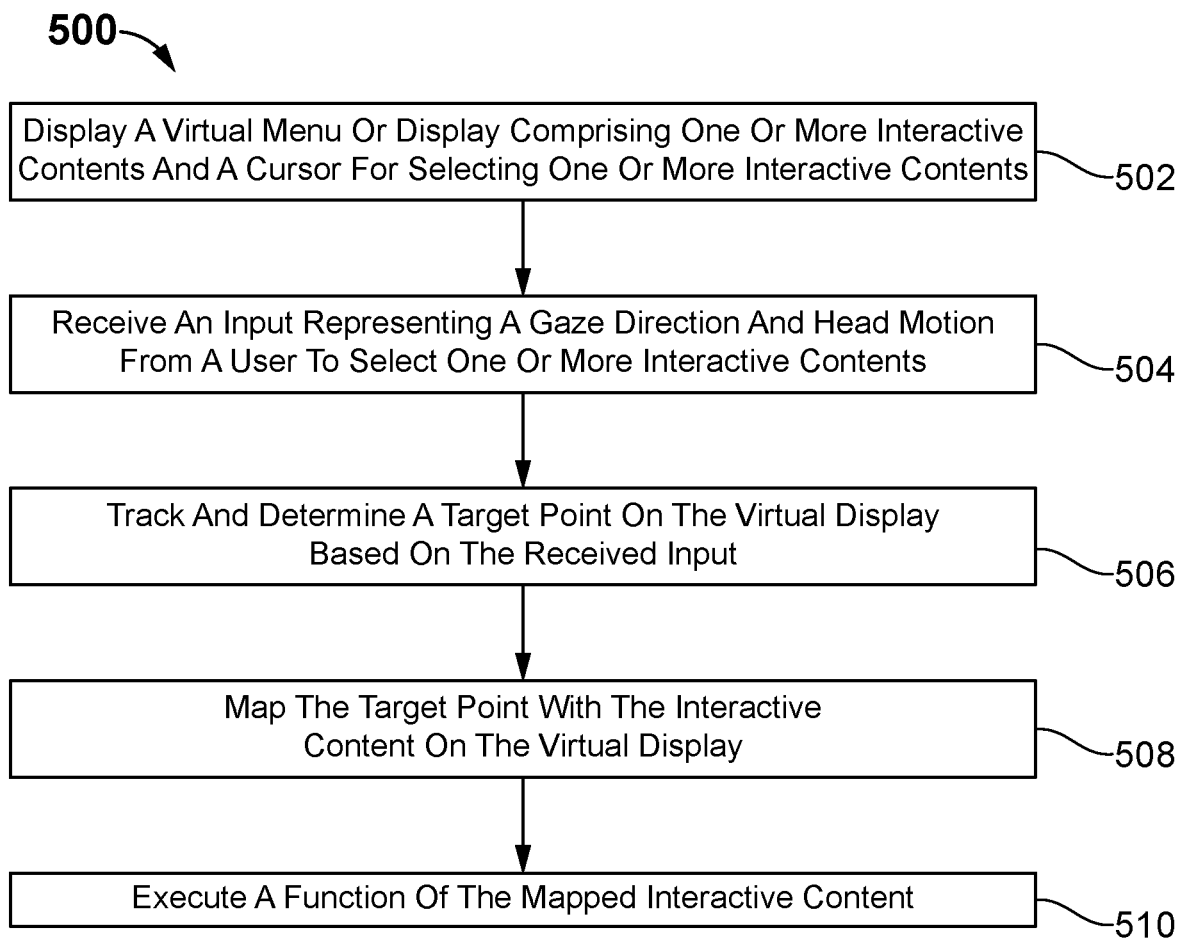
FIG. 5 is a flowchart of a method for providing gaze-based user interface for the device in an embodiment of the present invention.

FIG. 5 illustrates a method 500 for providing gaze-based user interface for an augmented and mixed reality device 100 in an embodiment of the present invention. The method 500 comprises a step 502 of: displaying at the processor 204, via a display module 208, a virtual menu or display comprising one or more interactive contents and a cursor for selecting one or more interactive contents. The method 500 further comprises a step 504 of: receiving at the processor 204, via a gaze and head motion detector module 210, an input representing a gaze direction and head motion from a user to select one or more interactive contents. The method 500 further comprises a step 506 of: tracking and determining at the processor 204, via a gaze and head motion detector module 210, a target point on a virtual display based on the received input. The method 500 further comprises a step 508 of: mapping at the processor 204, via a mapping module 212, the target point with the interactive content on the virtual display. The method 500 further comprises a step 510 of: executing at the processor 204, via an output module 214, a function of the mapped interactive content.

Figure 6:
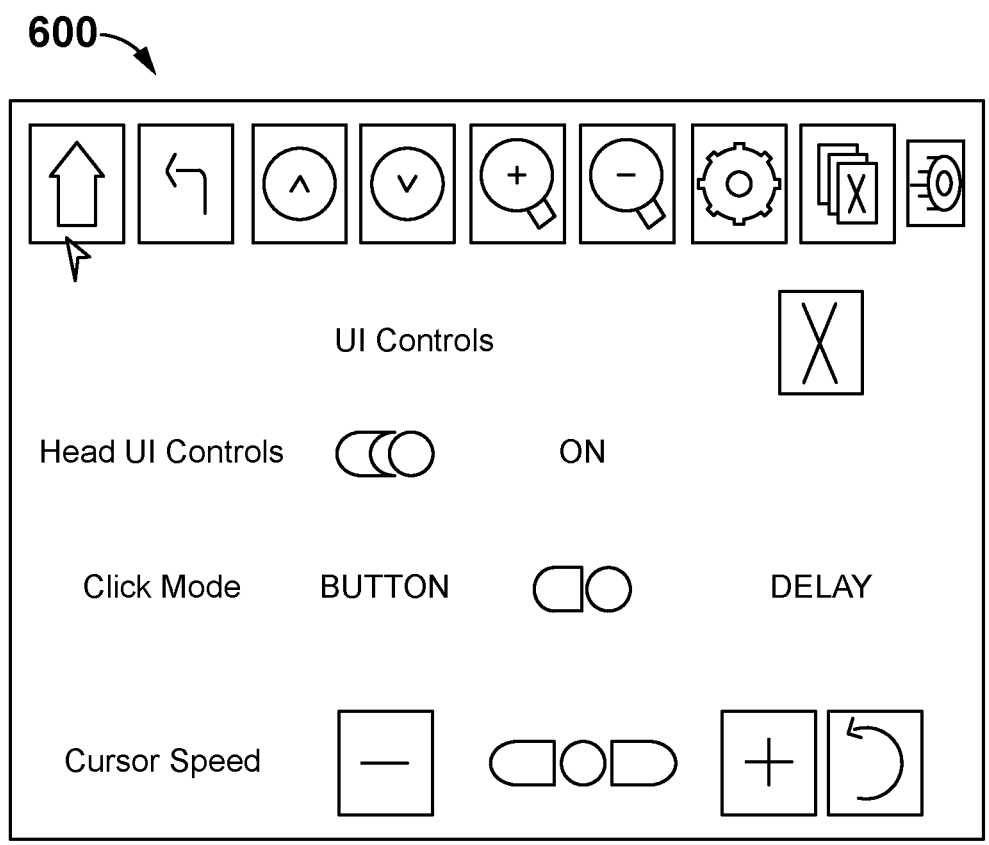
FIG. 6 exemplarily illustrates a screenshot of the interactive contents of a virtual display in an embodiment of the present invention.

FIG. 6 exemplarily illustrates a screenshot 600 of the interactive contents of a virtual display in an embodiment of the present invention. The screenshot 600 displays the interactive contents such as, a scroll up icon, a scroll down icon, zoom in icon, zoom out icon, exit all icon, home screen icon, back icon, minimization icon, volume adjusting icon. The user is enabled to manipulate the cursor to a desired interactive content utilizing the user's head motion and gaze. Then the user needs to stare at the interactive content for a predefined time to select the particular interactive content.

Figure 7:
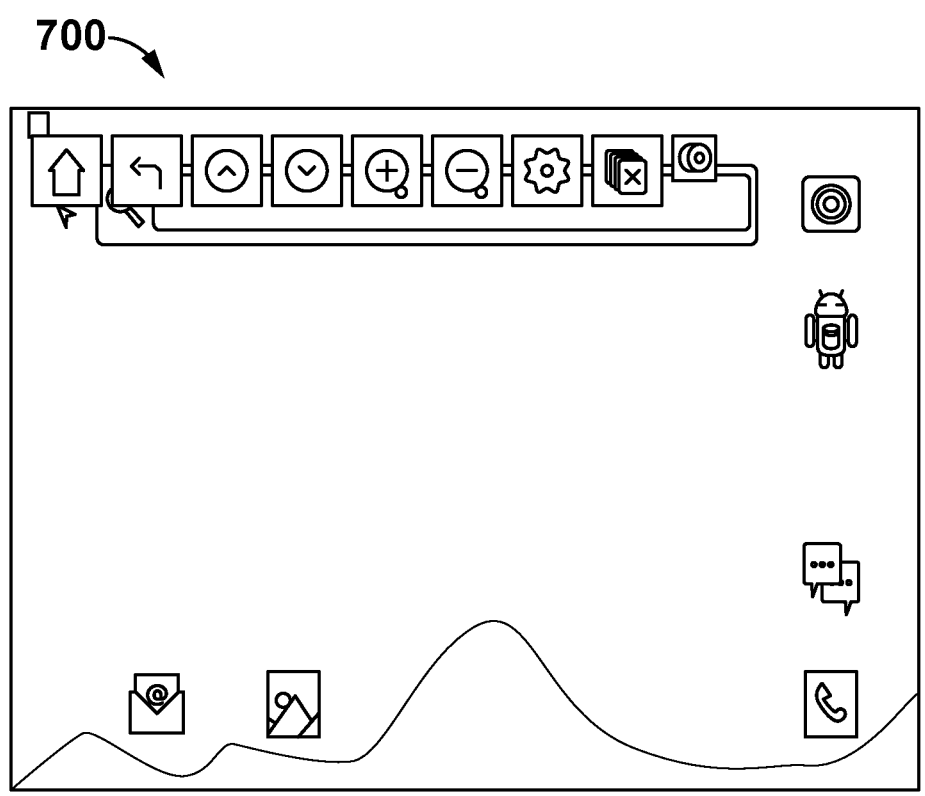
FIG. 7 exemplarily illustrates a screenshot of the interactive contents of the virtual display in another embodiment of the present invention.

FIG. 7 exemplarily illustrates a screenshot 700 of the interactive contents of the virtual display in another embodiment of the present invention. The screenshot 700 displays the interactive content that enables customization of the virtual display, represented as gear icon. The device 100 enables the user to customize the speed of the click, i.e., that user could change how slow or fast the device 100 clicks on a button. This is done by recalibrating the IMU data to allow for significantly slower "clicks" (~5 seconds) to much faster clicks (~1-2 seconds).

The device 100 further enables to activate/deactivate the gaze-based user interface temporarily/permanently. The device 100 further enables to control the speed of the head motion, i.e., that user could adjust how fast the android cursor moves on the screen. This is done by mathematically adjusting the slowness or rapidity of the android cursor on the home screen so that the cursor can move quickly (20 degrees per head rotation) or slowly (5 degrees per head rotation) depending on the user preference.

In an embodiment, if the user decreases cursor speed, the average raw and android IMU values are decreased in their values thus causing the speed of the cursor related to head movement tracked by the accelerometer to decrease.

In an embodiment, if the user increases cursor speed incrementally, the average raw and android IMU values are doubled in their values thus causing the speed of the cursor related to head movement tracked by the accelerometer to increase. The maximum cursor speed is 8× as that is the android sensor IMU limit for how fast the cursor could move. If the cursor speed exceeds 8× any, the screen size will not be sufficient. The minimum cursor speed is zero, which means the cursor does not move at all with head motion because the IMU values have decreased so much, so user has to use physical android select button to click.

The device 100 further enables to adjust location of UI controls or interactive contents. The user could move the UI controls to different parts of the screen or minimize it completely per the user preference. The device 100 further enables to disable UI controls permanently. The user could permanently disable UI controls via the settings tab and control the User Interface via a Bluetooth keypad or some other 3rd party controller. In one embodiment, the UI controls of the device 100 could be updated remotely, via an administration portal. This allows for more recent OTA or firmware updates to be sent for better sensor calibration and other aspects that allow for a seamless UI experience on the device 100.

Advantageously, the present invention the utilizes plurality of sensor data to manipulate an interactive item or content in a virtual display at high accuracy. The present invention further provides a cursor controllable by user's gaze to manipulate the interactive item on the virtual display. Further allows remote update of UI controls for more recent OTA or firmware updates, which provides a seamless UI experience on the device 100. The UI controls and the virtual display could be customized based on user preference. The utilization of multi sensor data accurately tracks the gaze direction and head motion of the user, thereby increasing the overall accuracy of the output.

Although a single embodiment of the invention has been illustrated in the accompanying drawings and described in the above detailed description, it will be understood that the invention is not limited to the embodiment developed herein, but is capable of numerous rearrangements, modifications, substitutions of parts and elements without departing from the spirit and scope of the invention.

The foregoing description comprises illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

What is claimed is:

1. An augmented and mixed reality headset device for providing a gaze-based user interface, comprising:
    a plurality of sensors configured to track gaze direction and bead motion of a user, wherein the plurality of sensors comprising a standard inertial measurement unit (IMU) and a raw inertial measurement unit wherein the standard inertial measurement unit is enclosed at a side frame portion of the headset device and the raw inertial measurement unit is disposed at a center region of an eyeglass frame of the headset device:
    one or more processors, wherein the raw inertial measurement unit is coupled to the processor: a memory; and
    one or more modules stored in the memory and executable by the one or more processors to perform operations, wherein the modules comprising:
    a display module configured to provide a virtual display comprising one or more interactive contents and a cursor for selecting the one or more interactive contents;
    a gaze and head motion detector module configured to receive an input representing a gaze direction and head motion of the user from the sensors to determine a target point on the virtual display;
    a mapping module configured to map the target point with the interactive content on the virtual display, and
    an output module configured to execute one or more functions of the mapped interactive content.

2. The device of claim 1, wherein the display module is configured to display a cursor to provide the input.

3. The device of claim 1, wherein the input is provided utilizing a user's gaze and head motion.

4. The device of claim 1, wherein the interactive content comprises a scroll up icon, a scroll down icon, zoom in icon, zoom out icon, exit all icon, home screen icon, back icon, minimization icon, and volume adjusting icon.

5. The device of claim 4, wherein the exit all icon enables to simultaneously exit from active applications running on the mixed reality device.

6. The device of claim 4, wherein the zoom in icon enables zoom in of a camera-based application.

7. The device of claim 4, wherein the zoom out icon enables to zoom out of a camera-based application.

8. The device of claim 4, wherein the home screen icon enables to display a home screen in the virtual display.

9. The device of claim 4, wherein the hack-button icon enables to display the previous screen.

10. The device of claim 4, wherein the minimization and maximization icon enable minimization or maximization based on the user preference.

11. The device of claim 4, wherein the volume adjusting icon enables to control the volume according to the user preference.

12. The device of claim 1, further comprises a customization module configured to: enable the user to customize the location of the one or more interactive contents; enable the user to activate or deactivate the gaze based user interface; enable the user to activate or deactivate the one or more interactive contents, and enable the user to adjust the speed of the cursor.

13. The device of claim 1, is a wearable headset device.

14. The device of claim 1, is configured to remotely update the interactive contents.

15. The device of claim 1, wherein the plurality of sensors comprises camera, accelerometer and gyroscope.

* * * * *